US012683456B2

(12) United States Patent
Kim

(10) Patent No.: US 12,683,456 B2
(45) Date of Patent: Jul. 14, 2026

(54) MOTOR ASSEMBLY WITH ELASTIC MEMBER CONTACTING A PRINTED CIRCUIT BOARD AND A CONNECTOR COVER

(71) Applicant: HL MANDO CORPORATION, Gyeonggi-do (KR)

(72) Inventor: Jihwan Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 113 days.

(21) Appl. No.: 18/420,561

(22) Filed: Jan. 23, 2024

(65) Prior Publication Data

US 2025/0023419 A1 Jan. 16, 2025

(30) Foreign Application Priority Data

Jul. 14, 2023 (KR) ........................ 10-2023-0091496

(51) Int. Cl.
*H02K 5/22* (2006.01)
*B62D 5/04* (2006.01)
*H01R 12/71* (2011.01)
*H01R 13/52* (2006.01)
*H02K 5/10* (2006.01)
(Continued)

(52) U.S. Cl.
CPC ........... *H02K 5/225* (2013.01); *B62D 5/0403* (2013.01); *H02K 5/10* (2013.01); *H02K 5/24* (2013.01); *H02K 11/33* (2016.01); *H01R 12/716* (2013.01); *H01R 13/521* (2013.01)

(58) Field of Classification Search
CPC .. H02K 5/10; H02K 5/22; H02K 5/24; H02K 5/225; H02K 11/30; H02K 11/33; B62D 5/0406; H01R 12/716; H01R 13/521
See application file for complete search history.

(56) References Cited

U.S. PATENT DOCUMENTS

2002/0079758 A1* 6/2002 Matsuyama ........... H02K 5/225
310/91
2007/0144822 A1 6/2007 Tominaga et al.
(Continued)

FOREIGN PATENT DOCUMENTS

JP 2016107885 A * 6/2016
KR 10-2002-0053756 7/2002
(Continued)

OTHER PUBLICATIONS

Yoshikawa, Machine Translation of WO2018193995, Oct. 2018 (Year: 2018).*
(Continued)

*Primary Examiner* — Eric Johnson
(74) *Attorney, Agent, or Firm* — WOMBLE BOND DICKINSON (US) LLP

(57) ABSTRACT

A steering apparatus for a vehicle includes a motor housing having a motor built therein; a board housing having a printed circuit board built therein, and coupled to the motor housing; a connector cover provided with connector terminals electrically connected to elements of the printed circuit board, and coupled to the board housing; and an elastic member having one surface brought into close contact with the printed circuit board and the other surface brought into close contact with the connector cover.

18 Claims, 10 Drawing Sheets

(51) Int. Cl.
  *H02K 5/24*         (2006.01)
  *H02K 11/33*        (2016.01)

(56)                    References Cited

U.S. PATENT DOCUMENTS

| 2016/0082908 | A1* | 3/2016 | Nakano | B60T 13/745 |
| | | | | 307/10.1 |
| 2016/0084347 | A1* | 3/2016 | Qi | H02K 5/225 |
| | | | | 74/425 |
| 2020/0195098 | A1* | 6/2020 | Shimakawa | H02K 9/227 |
| 2023/0118691 | A1* | 4/2023 | Morimoto | B62D 5/0406 |
| | | | | 310/71 |

FOREIGN PATENT DOCUMENTS

| KR | 10-2007-0053599 | 5/2007 | | |
| KR | 10-0759878 | 9/2007 | | |
| KR | 10-1616578 | 4/2016 | | |
| KR | 10-2019-0029002 | 3/2019 | | |
| WO | WO-2018193995 | A1* | 10/2018 | H02K 11/30 |

OTHER PUBLICATIONS

ISHI, Machine Translation of JP2016107885, Jun. 2016 (Year: 2016).*

Office Action dated Mar. 20, 2026 for Korean Patent Application No. 10-2023-0091496 and its English translation by provided by Applicant's foreign counsel.

* cited by examiner

FIG.5

MOTOR ASSEMBLY WITH ELASTIC MEMBER CONTACTING A PRINTED CIRCUIT BOARD AND A CONNECTOR COVER

CROSS-REFERENCE TO RELATED APPLICATION

This application claims priority from Korean Patent Application No. 10-2023-0091496, filed on Jul. 14, 2023, which is hereby incorporated by reference for all purposes as if fully set forth herein.

BACKGROUND

Field

The present embodiments relate to a steering apparatus for a vehicle, and more particularly, to a rack assist type power steering apparatus which is capable of preventing moisture from entering an electronic control device in a steering apparatus for a vehicle to cause an error or a failure of the electronic control device and which is capable of preventing a malfunction or a failure of an electronic control device during autonomous driving, specifically, preventing, if two electronic control devices are provided to secure reliability, both the electronic control devices from failing due to introduction of moisture, thereby securing a driver's safety.

Description of Related Art

A general steering apparatus for a vehicle includes a motor which is controlled by an electronic control device, a motor pulley which is fixed to a motor shaft, a ball nut which is coupled to a rack bar by the medium of balls, a return tube which is coupled to the ball nut and through which the balls are circulated, a nut pulley which is coupled to the circumferential outer surface of the ball nut, a belt which is coupled to the motor pulley and the nut pulley, and so on.

Recently, a steer-by-wire (SBW) steering apparatus, in which a mechanical connection device such as a steering column, a universal joint or an intermediate shaft is removed between a steering wheel and wheels and instead an electric motor such as a motor is used to steer a vehicle, has been developed and is being applied.

However, in the case of such a steering apparatus for a vehicle, a problem arises in that moisture enters the inside of an electronic control device while a vehicle is driven, due to complex factors such as vibration caused by long-term driving, shock transferred from a road surface and rainwater or water accumulated on the road surface, causing an error or a failure of the electronic control device.

In particular, if a malfunction or a failure of the electronic control device occurs during autonomous driving, control of the motor may not be carried out, causing a problem in that a driver's safety cannot be guaranteed.

Therefore, a need for research to prevent a malfunction or a failure of an electronic control device due to introduction of moisture from the outside is emerging.

BRIEF SUMMARY

Accordingly, embodiments have been made under the above-described background, and may provide a steering apparatus for a vehicle, which is capable of preventing an error or a failure of an electronic control device from occurring due to moisture entering the electronic control device.

In addition, embodiments may provide a steering apparatus for a vehicle, which is capable of preventing a malfunction or a failure of an electronic control device during autonomous driving, specifically, preventing, if two electronic control devices are provided to secure reliability, both the electronic control devices from failing due to introduction of moisture, thereby securing a driver's safety.

Objects to be achieved by embodiments are not limited to the aforementioned objects, and those skilled in the art may clearly understand other objects from the following descriptions.

In an embodiment, a steering apparatus for a vehicle may include: a motor housing having a motor built therein; a board housing having a printed circuit board built therein, and coupled to the motor housing; a connector cover provided with connector terminals electrically connected to elements of the printed circuit board, and coupled to the board housing; and an elastic member having one surface brought into close contact with the printed circuit board and the other surface brought into close contact with the connector cover.

In an embodiment, a steering apparatus for a vehicle may include: a motor housing having a motor built therein; a board housing having a printed circuit board built therein, and coupled to the motor housing; a connector cover provided with connector terminals electrically connected to elements of the printed circuit board and a protruding wall formed around the connector terminals to protrude toward the printed circuit board, and coupled to the board housing; and an elastic member having one surface brought into close contact with the printed circuit board and the other surface brought into close contact with the protruding wall.

According to the embodiments, in a steering apparatus for a vehicle, it is possible to prevent an error or a failure of an electronic control device from occurring due to moisture entering the electronic control device.

In addition, it is possible to prevent a malfunction or a failure of an electronic control device during autonomous driving, specifically, prevent, if two electronic control devices are provided to secure reliability, both the electronic control devices from failing due to introduction of moisture, thereby securing a driver's safety.

DESCRIPTION OF DRAWINGS

The above and other objects, features, and advantages of the present disclosure will be more clearly understood from the following detailed description, taken in conjunction with the accompanying drawings, in which:

Figure 5:
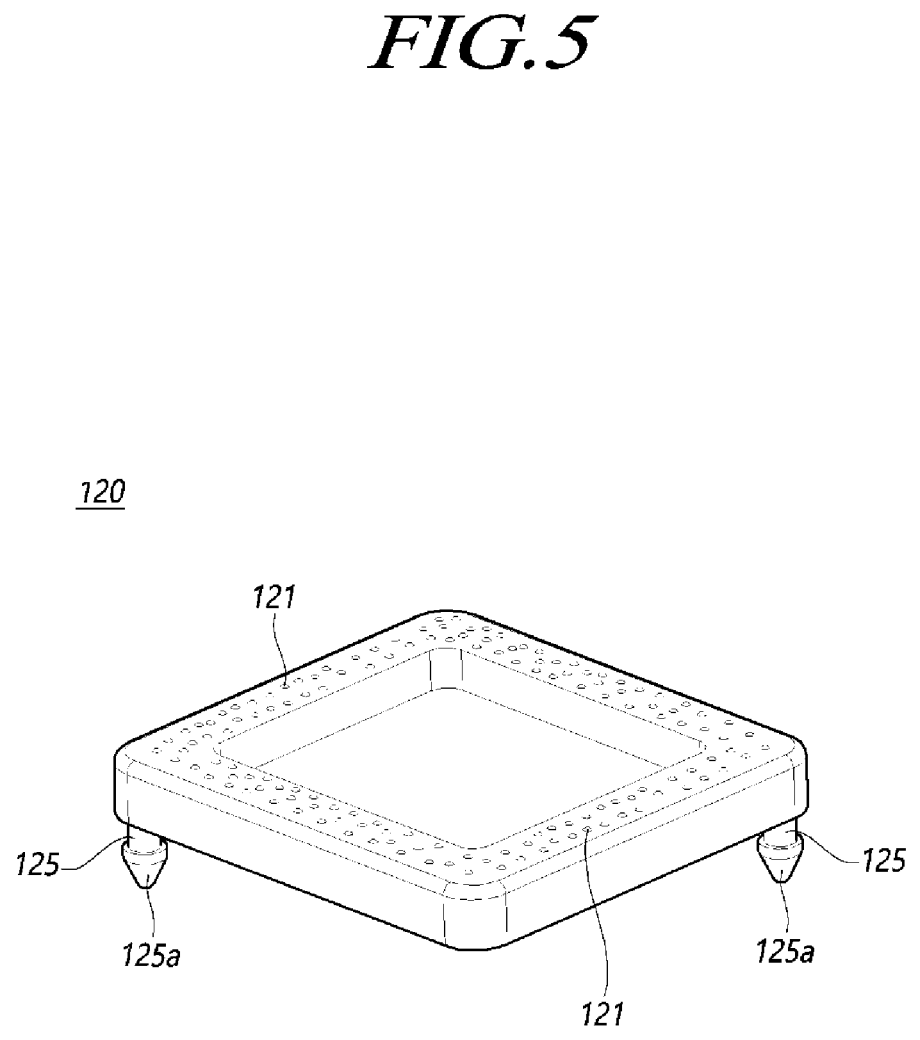

FIGS. 1 to 6 are perspective views illustrating parts of a steering apparatus for a vehicle in accordance with an embodiment;

DETAILED DESCRIPTION

Figure 1:
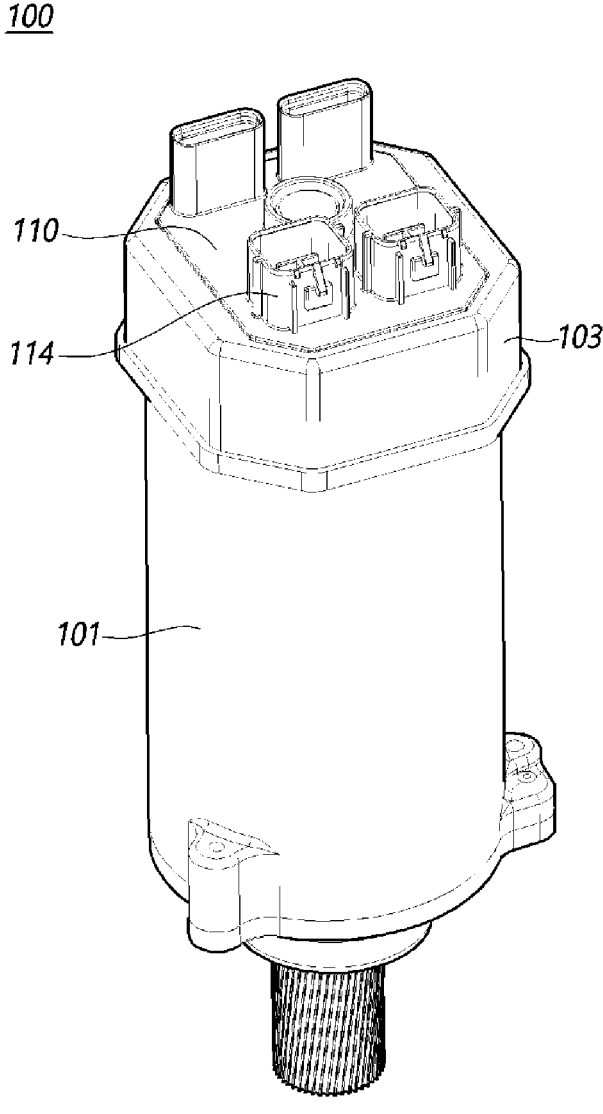
Figure 2:
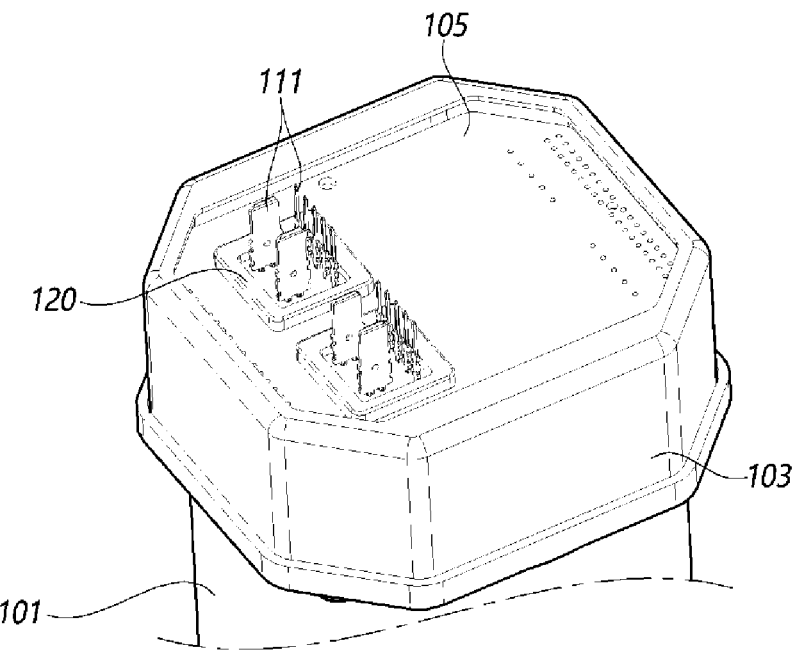
Figure 3:
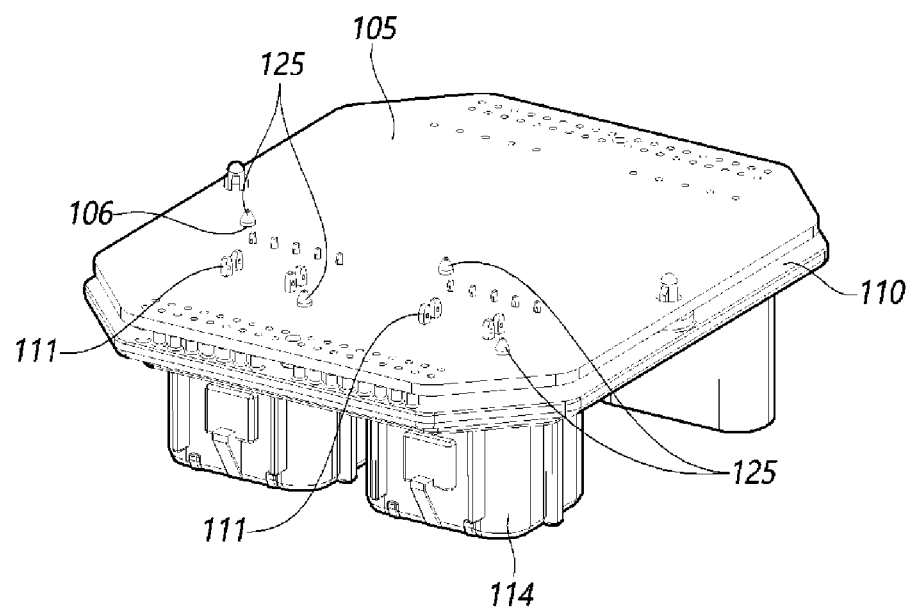
Figure 4:
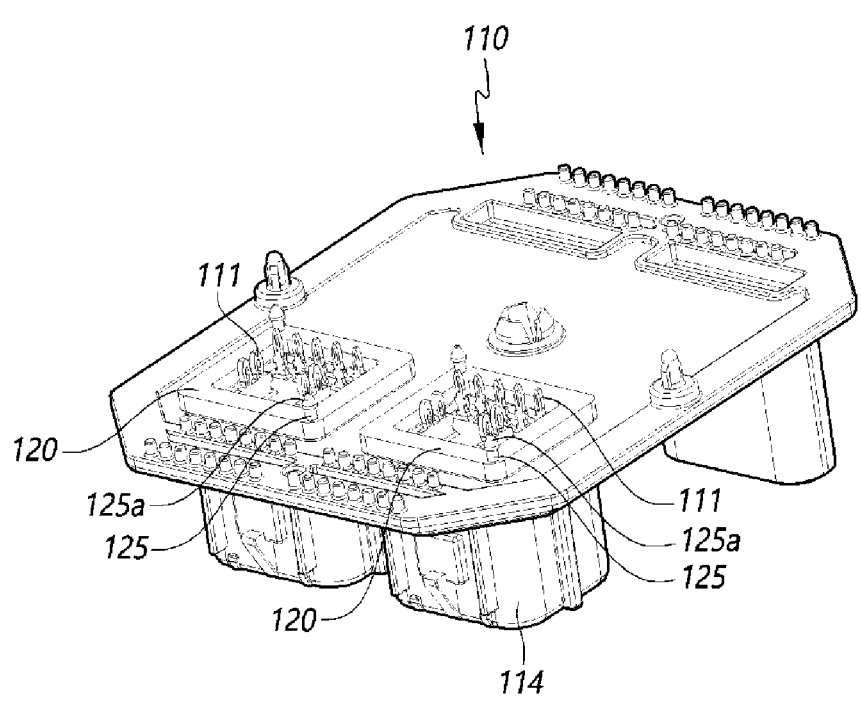
Figure 6:
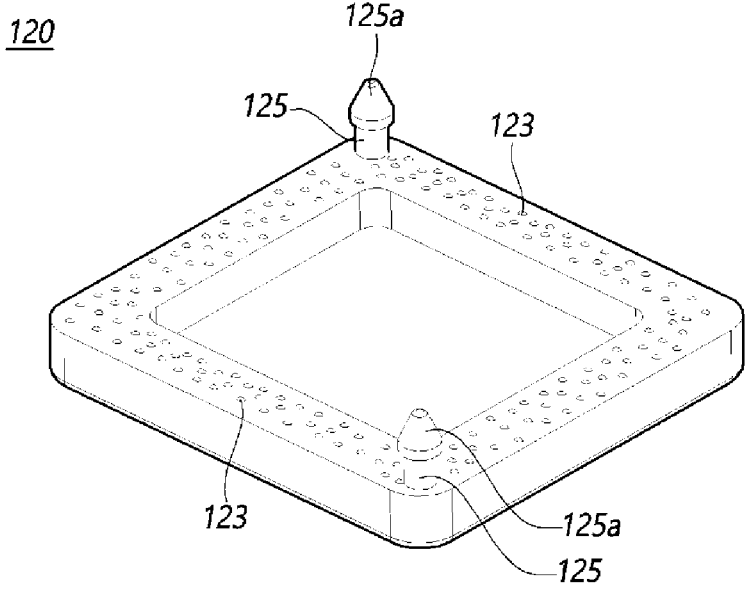

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 7:
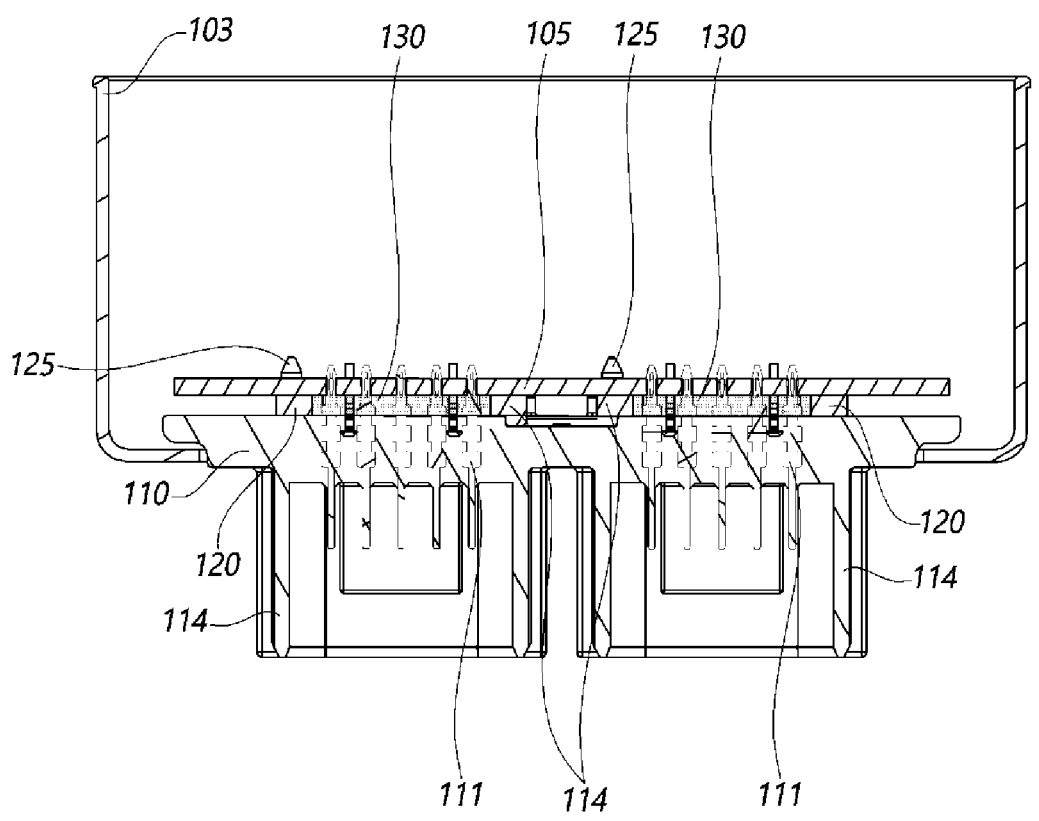
FIG. 7 is a cross-sectional view illustrating a part of the steering apparatus for a vehicle in accordance with the embodiment.
Figure 8:
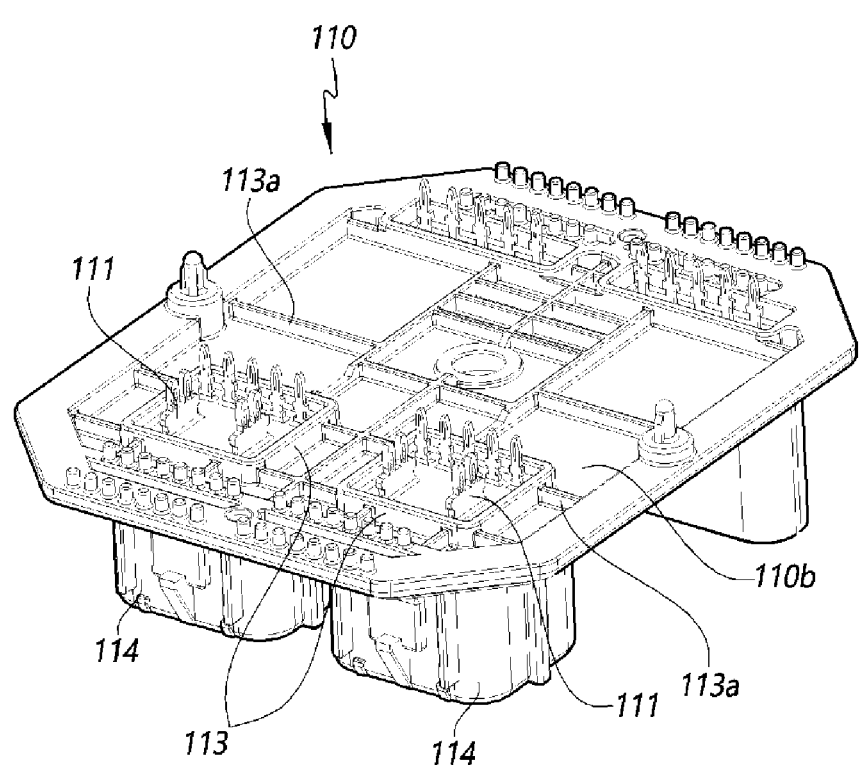
FIGS. 8 and 9 are perspective views illustrating parts of a steering apparatus for a vehicle in accordance with an embodiment.
Figure 9:
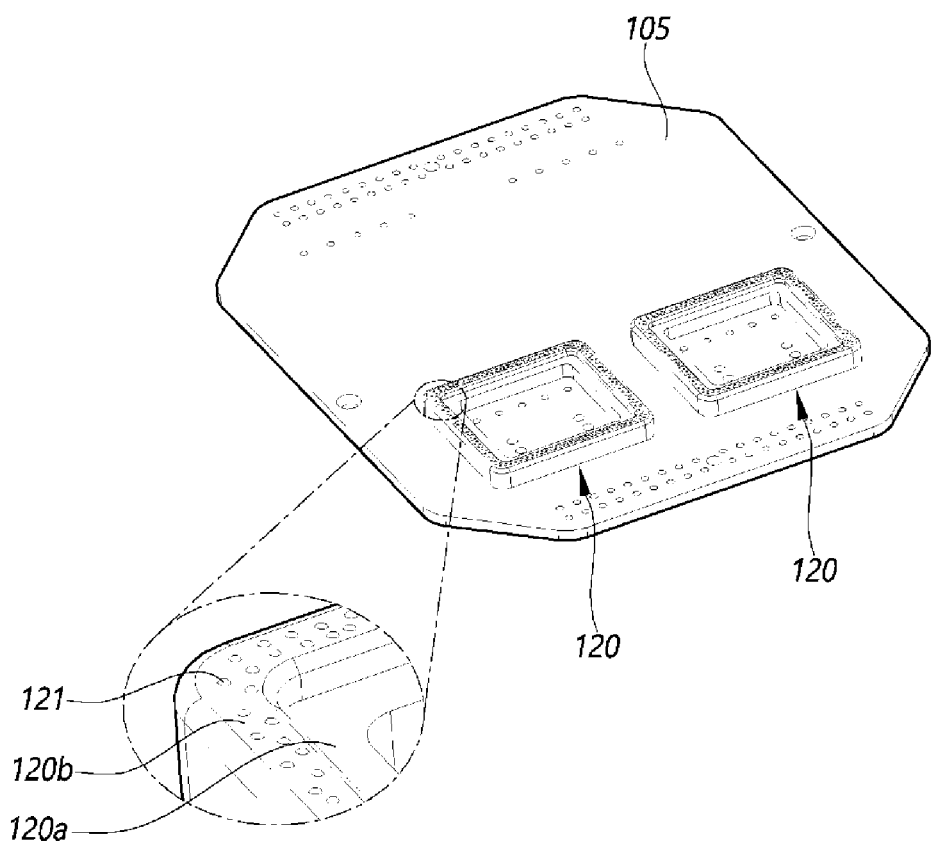
Figure 10:
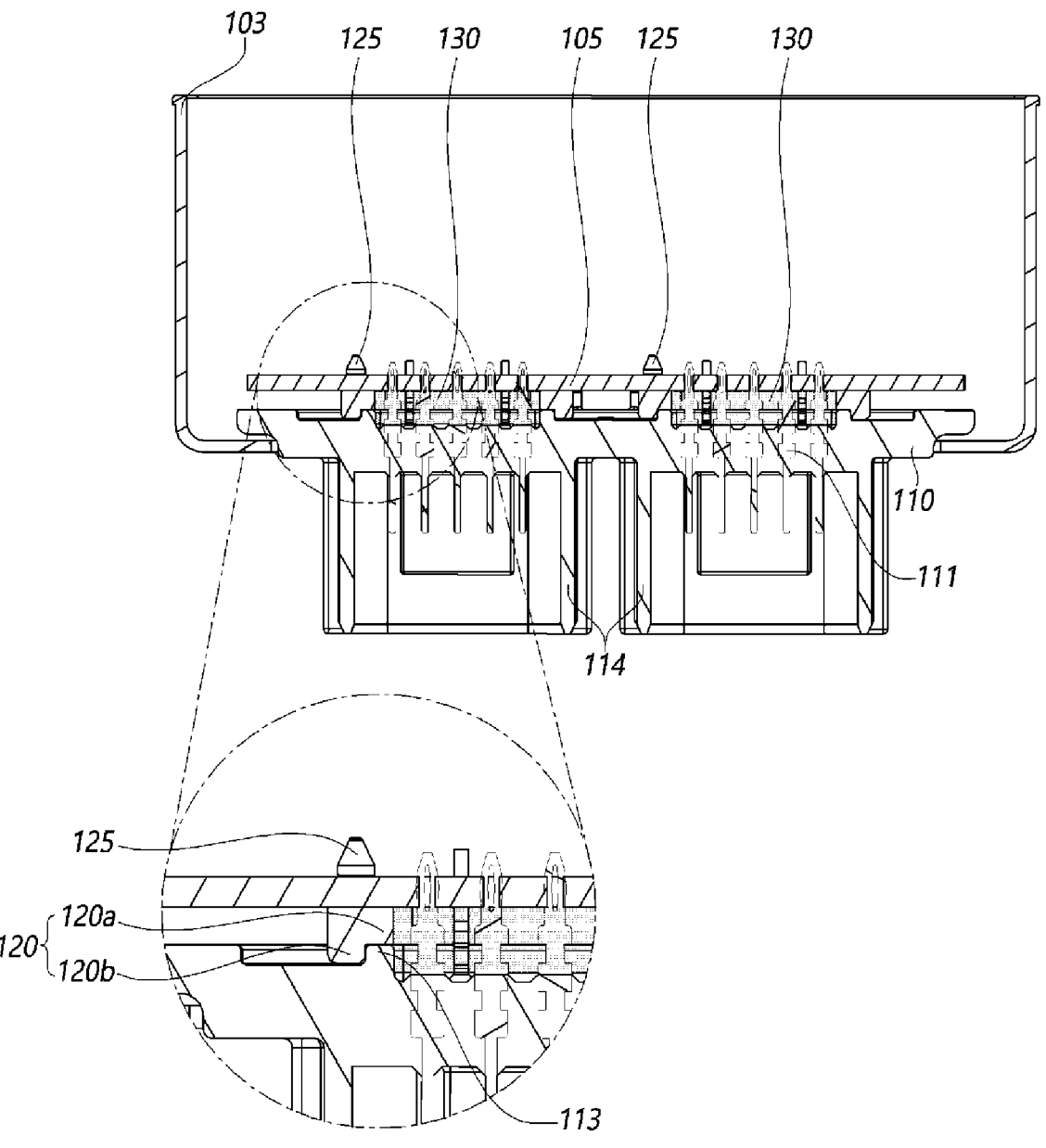
FIG. 10 is a cross-sectional view illustrating a part of the steering apparatus for a vehicle in accordance with the embodiment.

FIGS. 1 to 6 are perspective views illustrating parts of a steering apparatus for a vehicle in accordance with an embodiment, FIG. 7 is a cross-sectional view illustrating a part of the steering apparatus for a vehicle in accordance with the embodiment, FIGS. 8 and 9 are perspective views illustrating parts of a steering apparatus for a vehicle in accordance with an embodiment, and FIG. 10 is a cross-sectional view illustrating a part of the steering apparatus for a vehicle in accordance with the embodiment.

First, referring to FIGS. 1 to 7, the steering apparatus for a vehicle in accordance with the embodiment includes a motor housing 101 in which a motor is built, a board housing 103 in which a printed circuit board 105 is built and which is coupled to the motor housing 101, a connector cover 110 which is provided with connector terminals 111 electrically connected to elements of the printed circuit board 105 and is coupled to the board housing 103, and an elastic member 120 which has one surface brought into close contact with the printed circuit board 105 and the other surface brought into close contact with the connector cover 110.

A power pack 100, which includes a motor and an electronic control device, steers a vehicle by rotating wheels by sliding a rack bar by the medium of a worm wheel reducer or a belt reducer. Since this is a general configuration in the technical field to which the embodiment belongs, detailed description thereof will be omitted.

The power pack 100 largely includes the motor housing 101 and the board housing 103. The connector cover 110 for connection to a power supplier and the electronic control device mounted to the vehicle is coupled to the upper end of the board housing 103.

The connector cover 110 is provided with the connector terminals 111 which are electrically connected to the elements of the printed circuit board 105, and the connector terminals 111 are built inside a socket part 114.

The board housing 103, which is substantially formed in a box shape, is coupled to the upper part of the motor housing 101 which is cylindrical, and the printed circuit board 105 is built inside the board housing 103.

The elastic member 120 is provided between the printed circuit board 105 and the connector cover 110 to prevent moisture from entering the connector terminals 111.

The elastic member 120 has the one surface which is brought into close contact with the printed circuit board 105 and the other surface which is brought into close contact with the connector cover 110, and is disposed around the connector terminals 111.

The elastic member 120 is required to be formed in a ring shape which surrounds the connector terminals 111 and is required to be formed of a material capable of absorbing vibration and noise while having a predetermined elasticity and rigidity. Therefore, the elastic member 120 may be formed of an elastic material such as NR (natural rubber), NBR (nitrile butadiene rubber), CR (chloroprene rubber), EPDM (ethylene propylene terpolymer), FPM (fluoro rubber), SBR (styrene butadine rubber), CSM (chlorosulphonated polyethylene), urethane and silicone.

The elastic member 120 may be fixed as the one surface is adhered or fused to the printed circuit board 105.

That is to say, the one surface of the elastic member 120 is adhered to the printed circuit board 105 with an adhesive, or the one surface of the elastic member 120 and the printed circuit board 105 are fixed to each other by a method such as heat fusion, ultrasonic fusion, high-frequency fusion and infrared fusion.

In this case, the elastic member 120 may be provided on the other surface thereof with cover support protrusions 121 which are elastically deformed while being supported by the connector cover 110.

The cover support protrusions 121 are formed to protrude in embossing shapes on the other surface of the elastic member 120. A plurality of cover support protrusions 121 are formed to be spaced apart from each other. When assembling the connector cover 110, as the cover support protrusions 121 are elastically deformed while being supported by the connector cover 110, watertightness may be increased.

The elastic member 120 may be fixed as the other surface is adhered or fused to the connector cover 110. The other surface of the elastic member 120 is adhered to the connector cover 110 with an adhesive, or the other surface of the elastic member 120 and the connector cover 110 are fixed to each other by a method such as heat fusion, ultrasonic fusion, high-frequency fusion and infrared fusion.

In this case, the elastic member 120 may be provided on the one surface thereof with board support protrusions 123 which are elastically deformed while being supported by the printed circuit board 105.

The board support protrusions 123 may be formed in the same plurality of embossing shapes as the cover support protrusions 121 described above.

A space between an inner area surrounded by the elastic member 120 and the connector terminals 111 may be filled with a sealing member 130 which water tightens the printed circuit board 105.

In other words, as the sealing member 130 is filled and solidified from the printed circuit board 105 to the connector cover 110, the inner area surrounded by the elastic member 120, that is, the connector terminals 111, are completely sealed so that, even if moisture is introduced from the outside, moisture is prevented from coming into contact with the connector terminals 111.

The sealing member 130 as a liquid or gel-like fluid resin is injected into the space between the inner area surrounded by the elastic member 120 and the connector terminals 111 and is then cooled and solidified to fill the empty space between the connector cover 110 and the printed circuit board 105 so that a space through which moisture is introduced is removed.

As the sealing member 130, potting resin such as silicone, urethane, epoxy and polyacrylate may be used. In the embodiment, resin of any material which is able to be injected into the empty space between the connector cover 110 and the printed circuit board 105 and is then cooled and solidified may be used.

A locking projection 125 which projects toward the printed circuit board 105 may be provided to a corner of the elastic member 120, and a locking hole 106 into which the locking projection 125 of the elastic member 120 is coupled may be provided to the printed circuit board 105.

A fixing portion 125a larger than the diameter of the locking hole 106 may be provided to the end of the locking projection 125.

Therefore, when assembling the elastic member 120 to the printed circuit board 105, the fixing portion 125a of the locking projection 125 is elastically deformed while being inserted through the locking hole 106. Then, when the fixing portion 125a passes through the locking hole 106, the fixing portion 125a is elastically restored and supported on the back surface of the printed circuit board 105 to be prevented from being released after assembly.

A steering apparatus for a vehicle in accordance with an embodiment includes a motor housing 101 in which a motor is built, a board housing 103 in which a printed circuit board 105 is built and which is coupled to the motor housing 101, a connector cover 110 which is provided with connector terminals 111 electrically connected to elements of the printed circuit board 105 and a protruding wall 113 formed around the connector terminals 111 to protrude toward the printed circuit board 105 and is coupled to the board housing 103, and an elastic member 120 which has one surface brought into close contact with the printed circuit board 105 and the other surface brought into close contact with the protruding wall 113.

Since the motor housing 101 and the board housing 103 are the same as those described above, detailed description thereof will be omitted hereinbelow and differences of the connector cover 110 and the elastic member 120 will be mainly described as follows. The protruding wall 113 provided around the connector terminals 111 is formed as a partition wall which protrudes from a bottom surface 110b of the connector cover 110 and surrounds the connector terminals 111. Partition walls are formed to be connected to each other. The embodiment illustrates, as an example, that each partition wall is arranged as a quadrangular frame.

Protruding walls 113 may be connected to each other by a connection ribs 113a to be reinforced in rigidity, and a plurality of connection ribs 113a may be formed.

The elastic member 120 may be fixed as the one surface is adhered or fused to the printed circuit board 105.

That is to say, the one surface of the elastic member 120 is adhered to the printed circuit board 105 with an adhesive, or the one surface of the elastic member 120 and the printed circuit board 105 are fixed to each other by a method such as heat fusion, ultrasonic fusion, high-frequency fusion and infrared fusion.

In this case, the other surface of the elastic member 120 may be provided with cover support protrusions 121 which are elastically deformed while being supported by the distal end surface of the partition wall.

The cover support protrusions 121 are formed to protrude in embossing shapes on the other surface of the elastic member 120. A plurality of cover support protrusions 121 are formed to be spaced apart from each other. When assembling the connector cover 110, as the cover support protrusions 121 are elastically deformed while being supported by the distal end surface of the partition wall, watertightness may be increased.

The other surface of the elastic member 120 may be fixed by being adhered or fused to the distal end surface of the protruding wall 113.

That is to say, the other surface of the elastic member 120 is adhered to the distal end surface of the protruding wall 113 with an adhesive, or the other surface of the elastic member 120 and the distal end surface of the protruding wall 113 are fixed to each other by a method such as heat fusion, ultrasonic fusion, high-frequency fusion and infrared fusion.

In this case, the one surface of the elastic member 120 may be provided with board support protrusions 123 which are elastically deformed while being supported by the printed circuit board 105, and the board support protrusions 123 may be formed in the same plurality of embossing shapes as the cover support protrusions 121 described above.

As illustrated in FIGS. 9 and 10, the elastic member 120 may include a distal end support part 120a which is supported by the distal end surface of the protruding wall 113 and a side support part 120b which is bent and extends outward from the outer edge of the distal end support part 120a to be supported by the outer surface of the protruding wall 113.

The distal end support part 120a and the side support part 120b are integrally formed with each other in a stepped shape so that the height of the side support part 120b is higher than the height of the distal end support part 120a and the side support part 120b is bent and extends in a height direction and an outward direction when viewed on a vertical cross-section.

Therefore, when assembling the connector cover 110, as the outer surface and the distal end surface of the protruding wall 113 are brought into close contact with the elastic member 120, moisture from the outside is prevented from entering the inner space of the elastic member 120, that is, the connector terminals 111.

A space between an inner area surrounded by the protruding wall 113 and the elastic member 120 and the connector terminals 111 may be filled with a sealing member 130 which watertightens the printed circuit board 105.

In other words, as the sealing member 130 is filled and solidified from the printed circuit board 105 to the bottom surface 110*b* of the connector cover 110, the inner area surrounded by the elastic member 120, that is, the connector terminals 111, are completely sealed so that, even if moisture is introduced from the outside, moisture is prevented from coming into contact with the connector terminals 111.

The sealing member 130 as a liquid or gel-like fluid resin is injected into the space between the inner area surrounded by the protruding wall 113 and the elastic member 120 and the connector terminals 111 and is then cooled and solidified to fill the empty space between the connector cover 110 and the printed circuit board 105 so that a space through which moisture is introduced is removed.

As the sealing member 130, potting resin such as silicone, urethane, epoxy and polyacrylate may be used. In the embodiment, resin of any material which is able to be injected into the empty space between the connector cover 110 and the printed circuit board 105 and is then cooled and solidified may be used.

A locking projection 125 which projects toward the printed circuit board 105 may be provided to a corner of the elastic member 120, a locking hole 106 into which the locking projection 125 is coupled may be provided to the printed circuit board 105, and a fixing portion 125*a* larger than the diameter of the locking hole 106 may be provided to the end of the locking projection 125.

Therefore, when assembling the elastic member 120 to the printed circuit board 105, the fixing portion 125*a* of the locking projection 125 is elastically deformed while being inserted through the locking hole 106. Then, when the fixing portion 125*a* passes through the locking hole 106, the fixing portion 125*a* is elastically restored and supported on the back surface of the printed circuit board 105 to be prevented from being released after assembly.

In this way, as an area where the printed circuit board 105 and the connector terminals 111 are coupled is watertightened by the sealing member 130 and is watertightened by the elastic member 120, a malfunction and a breakage of the printed circuit board 105 due to moisture are prevented.

As is apparent from the above description, according to the embodiments, in a steering apparatus for a vehicle, it is possible to prevent an error or a failure of an electronic control device from occurring due to moisture entering the electronic control device.

In addition, it is possible to prevent a malfunction or a failure of an electronic control device during autonomous driving, specifically, prevent, if two electronic control devices are provided to secure reliability, both the electronic control devices from failing due to introduction of moisture, thereby securing a driver's safety.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A motor assembly comprising:
   a motor housing accommodating a motor therein;
   a board housing accommodating a printed circuit board therein, the board housing coupled to the motor housing;
   a connector cover having connector terminals electrically connected to electric components of the printed circuit board, the connector cover coupled to the board housing; and
   an elastic member having one surface contacting the printed circuit board and an other surface contacting the connector cover,
   wherein the elastic member is substantially ring-shaped to surround the connector terminals, and
   wherein a locking projection protrudes from the one surface of the elastic member toward the printed circuit board, and a locking hole is formed on the printed circuit board such that the locking projection of the elastic member is inserted in the locking hole of the printed circuit board.

2. The motor assembly of claim 1, wherein the elastic member is disposed around the connector terminals.

3. The motor assembly of claim 1, wherein the one surface of the elastic member is fixed to the printed circuit board.

4. The motor assembly of claim 3, wherein the other surface of the elastic member has cover support protrusions configured to be elastically deformable and supported by the connector cover.

5. The motor assembly of claim 1, wherein the other surface of the elastic member is fixed to the connector cover.

6. The motor assembly of claim 5, wherein the one surface of the elastic member has board support protrusions configured to be elastically deformable and supported by the printed circuit board.

7. The motor assembly of claim 1, wherein a seal is disposed between an inner area surrounded by the elastic member and the connector terminals.

8. The motor assembly of claim 1, wherein an end portion of the locking projection of the elastic member has a fixing portion larger having a diameter than a diameter of the locking hole of the printed circuit board.

9. A motor assembly comprising:
   a motor housing accommodating a motor therein;
   a board housing accommodating a printed circuit board therein, the board housing coupled to the motor housing;
   a connector cover having connector terminals electrically connected to electric components of the printed circuit board, and a protruding wall formed around the connector terminals, protruding toward the printed circuit board, and coupled to the board housing; and
   an elastic member having one surface contacting the printed circuit board and an other surface contacting the protruding wall of the connector cover.

10. The motor assembly of claim 9, wherein the protruding wall of the connector cover comprises partition walls protruding from a bottom surface of the connector cover and surrounding the connector terminals.

11. The motor assembly of claim 10, wherein the one surface of the elastic member is fixed to the printed circuit board.

12. The motor assembly of claim 11, wherein the other surface of the elastic member has cover support protrusions configured to be elastically deformable and supported by a distal end surface of the protruding wall of the connector cover.

13. The motor assembly of claim 11, wherein the elastic member comprises:

a distal end support part supported by the distal end surface of the protruding wall of the connector cover; and a side support part bent and extending outward from an outer edge of the distal end support part and supported by an outer surface of the protruding wall of the connector cover.

14. The motor assembly of claim 10, wherein the elastic member is fixed to the distal end surface of the protruding wall of the connector cover.

15. The motor assembly of claim 14, wherein the one surface of the elastic member has board support protrusions configured to be elastically deformable and supported by the printed circuit board.

16. The motor assembly of claim 10, wherein a seal is disposed between an inner area surrounded by the protruding wall of the connector cover and the elastic member and the connector terminals.

17. The motor assembly of claim 10, wherein a locking projection protrudes from the one surface of the elastic member toward the printed circuit board, and a locking hole is formed on the printed circuit board such that the locking projection of the elastic member is inserted in the locking hole of the printed circuit board.

18. The motor assembly of claim 17, wherein an end portion of the locking projection of the elastic member has a fixing portion having a diameter larger than a diameter of the locking hole.

\* \* \* \* \*